(12) United States Patent
Kurosawa

(10) Patent No.: US 7,538,803 B2
(45) Date of Patent: May 26, 2009

(54) DIGITAL CAMERA WITH DEFOCUSED IMAGE AREA

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 1172 days.

(21) Appl. No.: 10/246,741

(22) Filed: Sep. 19, 2002

(65) Prior Publication Data

US 2003/0052988 A1 Mar. 20, 2003

(30) Foreign Application Priority Data

Sep. 20, 2001 (JP) ............................ P2001-286211

(51) Int. Cl.
| | |
|---|---|
| *H04N 5/235* | (2006.01) |
| *H04N 5/225* | (2006.01) |
| *H04N 5/232* | (2006.01) |
| *H04N 5/222* | (2006.01) |

(52) U.S. Cl. ..................... 348/239; 348/342; 348/349

(58) Field of Classification Search ................. 348/239, 348/342, 345, 347–349, 360, 363–364, 163, 348/208.14

See application file for complete search history.

(56) References Cited

U.S. PATENT DOCUMENTS

| 6,229,568 | B1 * | 5/2001 | Kawaguchi et al. | ......... 348/350 |
| 6,421,087 | B1 * | 7/2002 | Ikeda | .......................... 348/345 |
| 6,583,820 | B1 * | 6/2003 | Hung | ......................... 348/362 |
| 6,900,841 | B1 * | 5/2005 | Mihara | ....................... 348/345 |

\* cited by examiner

*Primary Examiner*—David L Ometz
*Assistant Examiner*—Carramah J Quiett
(74) *Attorney, Agent, or Firm*—Greenblum & Bernstein, P.L.C.

(57) ABSTRACT

There is provided a digital camera, which is provided with an optical system which forms an image of an object, an image pick-up device which outputs an image signal corresponding to the image formed by said optical system, and a filtering system which filters the image to smooth at least a portion of the image based on the image signal outputted by the image pick-up device. The filtering system may calculate moving averages of pixels in the image. The digital camera may include a filter control system which is configured to change characteristics of the filtering system.

14 Claims, 10 Drawing Sheets

DIGITAL CAMERA WITH DEFOCUSED IMAGE AREA

BACKGROUND OF THE INVENTION

The present invention relates to a digital camera which employs an image pick-up device such as a CCD (charge-coupled device).

Recently, digital cameras which record image data on a medium such as a flash memory card, a smart card or the like have become widespread. A basic configuration of a digital camera is similar to a camera which uses a silver-salt film. That is, the digital camera includes components such as a photographing optical system for forming an image of an object on an image plane, and an aperture mechanism. In the digital camera, a CCD is provided instead of the photographing film on the Image plane.

FIG. 1 is a cross sectional view of a CCD 3 which is generally employed in a conventional digital camera. As shown in FIG. 1, on an upper portion of the CCD 3, a plurality of photoreceptors (photo diodes) 32 and transistors for transferring charges (not shown) are formed.

Above the photodiodes 32, apertures 33a are formed, respectively. The apertures 33a are covered with a plurality of micro-lenses 34, respectively, which form an image on the photodiodes 32 (i.e., on a light-receptive surface of the CCD 3).

Since the micro-lenses 34 converge light on the light-receptive surface of the CCD 3, the photographing optical system is required to form an image on the rear side of the light-receptive surface of the CCD 3. For this purpose, the photographing optical system should be configured such that rays of light incident on the micro-lens 34 are substantially parallel. That is, the photographing optical system in the digital camera is required to be substantially telecentric.

In a camera utilizing the silver-salt film, by making use of depth of fields, it is possible to intentionally form a defocused (i.e., out-of-focus) portion In an image of the object For example, by fully opening the aperture, a central object is focused, while a background is defocused. In the case of the digital camera, since the photographing optical system has the telecentricity as described above, it is difficult to obtain an image whose background is sufficiently defocused. That is, because of the telecentricity, the depth-of-fields of the digital camera is deeper than that of the camera which uses the silver-salt film.

Therefore, in order to obtain an image whose background is appropriately defocused, the image data should be once transmitted to a computer and is retouched using a photo retouching software.

SUMMARY OF THE INVENTION

The present invention is advantageous in that it provides a digital camera which is capable of obtaining an image whose background is appropriately defocused.

According to an aspect of the invention, there is provided a digital camera, which is provided with an optical system which forms an image of an object, an image pick-up device which receives the object image and outputs an image signal corresponding to the received object image, and a filtering system which receives and processes the image signal so that a smoothing effect is applied to at least a portion of the object image.

With this configuration, an image whose background is appropriately defocused can be obtained. There is no necessity to retouch the image captured by the digital camera using a photo retouch software.

Optionally, the filtering system may calculate moving averages of pixel data in the image.

Further optionally, the digital camera may be further provided with a filter control system which is configured to change characteristics of the filtering system. With this configuration, the degree of smoothness of the image can be changed.

Preferably, the filter control system may change the characteristics of the filtering system corresponding to a distance between a first position which lies in the image and a second position at which a moving average is calculated.

In a particular case, the first position may be a center of the image.

Preferably, the digital camera is further provided with an automatic focusing system which drives the optical system to perform focusing. This automatic focusing system has at least one AF area in which the optical system focuses on the object, and is configured to manually or automatically select one of the at least one AF area. In this case, the first position corresponds to the one of the at least one AF area manually or automatically selected by the automatic focusing system.

With this configuration, the degree of smoothness (i.e. the degree of defocused condition) of the background of the image can be changed responsive to the distance between the selected AF area and the second position at which a moving average is calculated In a particular case, the filter control system may change the characteristics of the filtering system such that the image includes at least one annular zone in which the degree of smoothness is uniform. In this case, the at least one annular zone may be arranged concentrically about the first position.

Alternatively, the rate of a change of the degree of smoothness of the image in a lateral direction of the image and the rate of a change of the degree of smoothness in a vertical direction of the image may be the same.

Alternatively, the rate of a change of the degree of smoothness of the image in a lateral direction of the image may be different from the rate of a change of the degree of smoothness of the image in a vertical direction of the image.

Optionally, the filter control system may change the characteristics of the filtering system corresponding to at least one of an object distance when the image is captured, an aperture diameter of an aperture which is provided in the optical system when the image is captured, and a focal length of said optical system in addition to the distance between the first position and the second position.

In a particular case, the optical system may be a zoom lens. In this case, the filter control system may change the characteristics of the filtering system responsive to a focal length of the zoom lens when the image is captured in addition to the distance between the first position and the second position.

Preferably, the digital camera may include a image processing system which processes the image signal to generate image data corresponding to the image formed by the optical system. In this case, the filtering system may be a digital filter which filters the image using the image data generated by the image processing system.

In a particular case, the digital camera may include an automatic aperture control system which calculates an f number to be used for capturing the image based on brightness information of the image to be captured and adjusts an aperture diameter of an aperture provided in the optical system according to the calculated f number. In this case, the filter control system may change the characteristics of the filtering system responsive to the f number calculated by the automatic iris control system in addition to the distance between the first position and the second position.

According to another aspect of the invention, there is provided a digital camera, which is provided with an image capturing system that captures an image of an object within a predetermined area and outputs an image signal representing the captured image; a processing system that processes the image signal, and a storage that stores the image signal processed by said processing system in the form of image data. In this case, the processing system includes a filtering system that defines at least one partial area in the predetermined area and coverts a part of the image signal representing an image segment included in the at least one partial area such that the image segment appears defocused.

In a particular case, the at least one partial area may include at least one annular area, respectively.

Optionally, the filtering system may define a plurality of annular areas centering around a predetermined point in the predetermined area, and the filtering system may vary a degree of defocused condition of image segments depending on the annular areas In which the image segments are included.

Still optionally, the degree of defocused condition of the Image segment may be greater for an image segment included in an outer annular area than an image segment included in an inner annular area.

In a particular case, the digital camera may further provided with a focusing condition detection system, and the predetermined point may correspond to a point at which the focusing condition detection system detects a focusing condition of the object.

Optionally, the focusing condition detection system may be capable of detecting a focusing condition of an object at a selected one of a plurality of points defined in the predetermined area, and the predetermined point may correspond to the selected one of the plurality of points.

Still optionally, the filtering system may change the degree of defocused condition for the plurality of annular zones at a first ratio along a longer side of the predetermined area, and at a second ratio along a shorter side of the predetermined area.

Still optionally, each of the first ratio and the second ratio is varied depending on at least one of an object distance, an aperture size of a photographing lens of the digital camera and a focal length of the photographing lens.

In a particular case, the first ratio and the second ratio may be different.

Alternatively, the first ratio and the second ratio may be substantially same.

BRIEF DESCRIPTION OF THE ACCOMPANYING DRAWINGS

Figure 3:
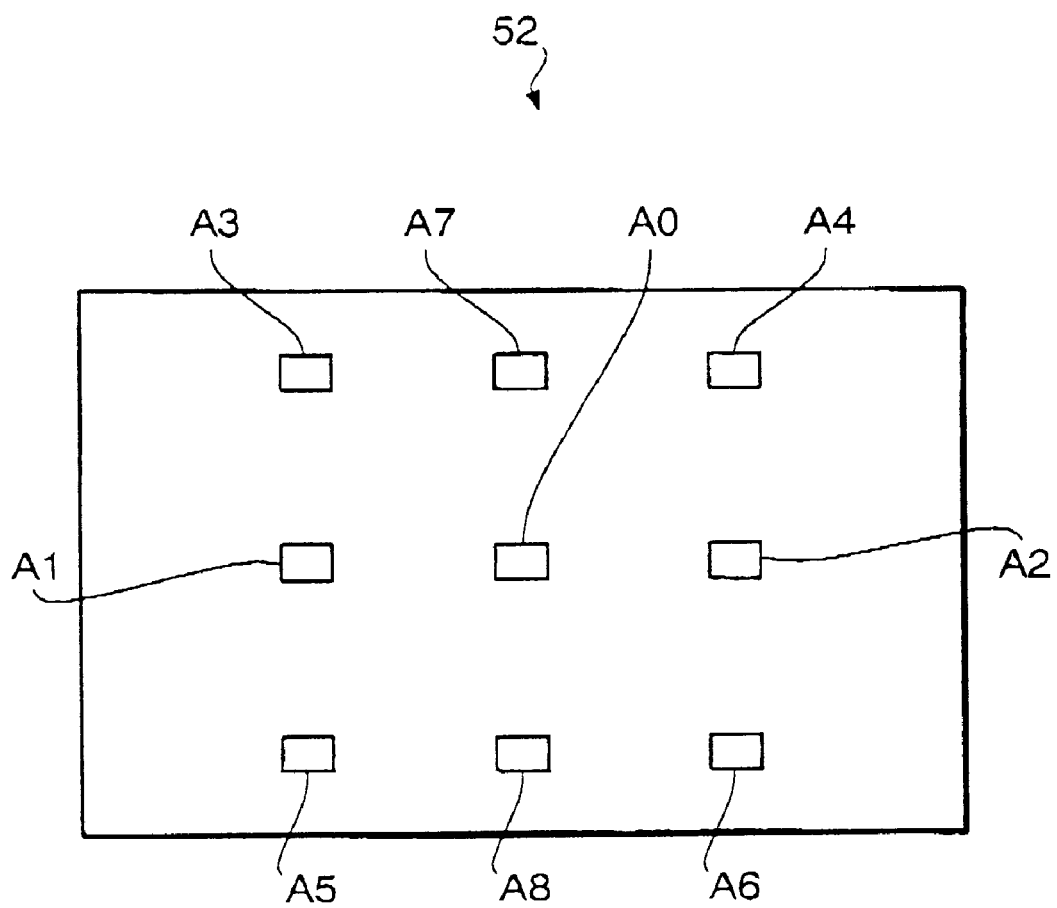
Figure 4:
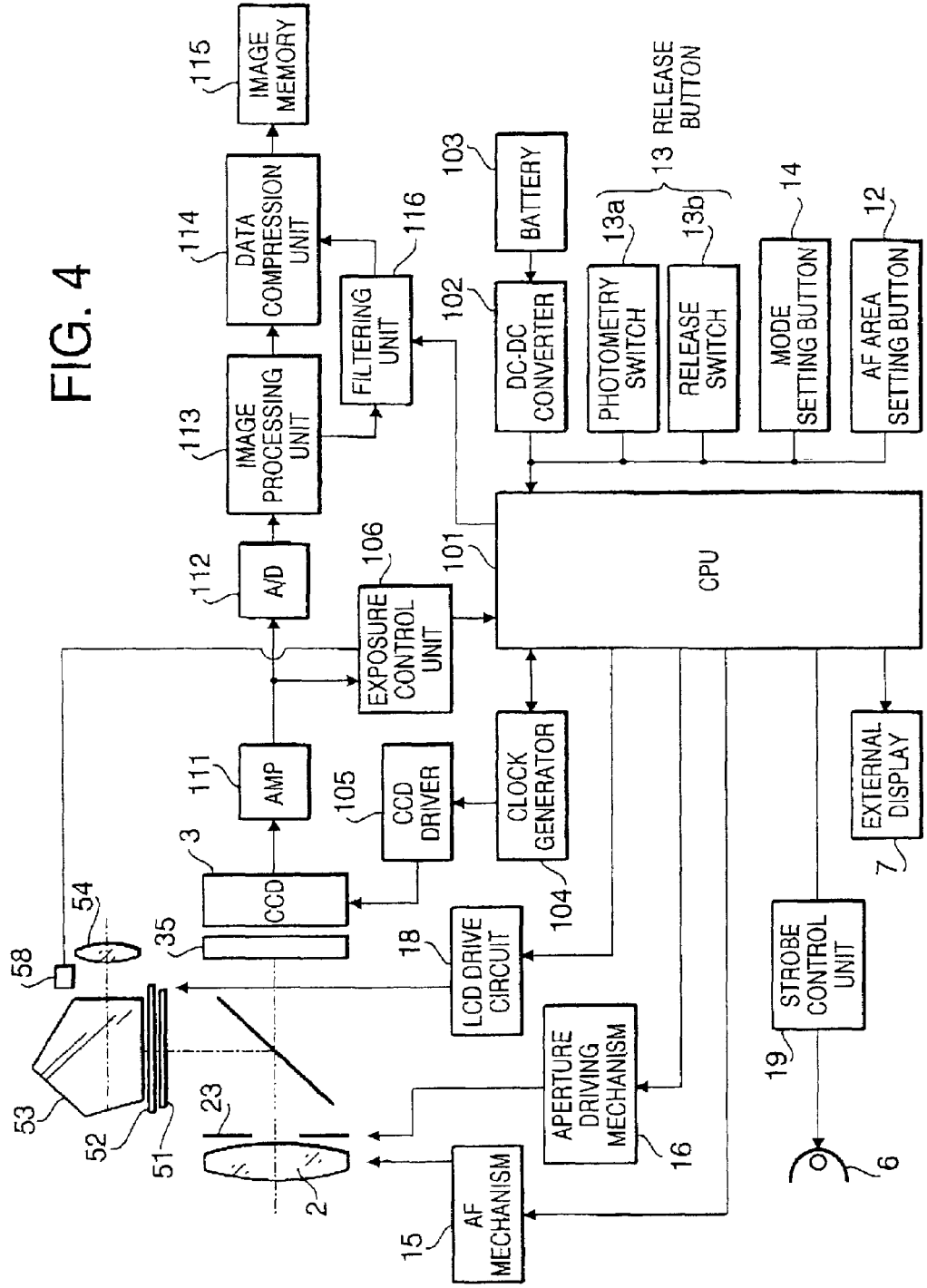
Figure 5:
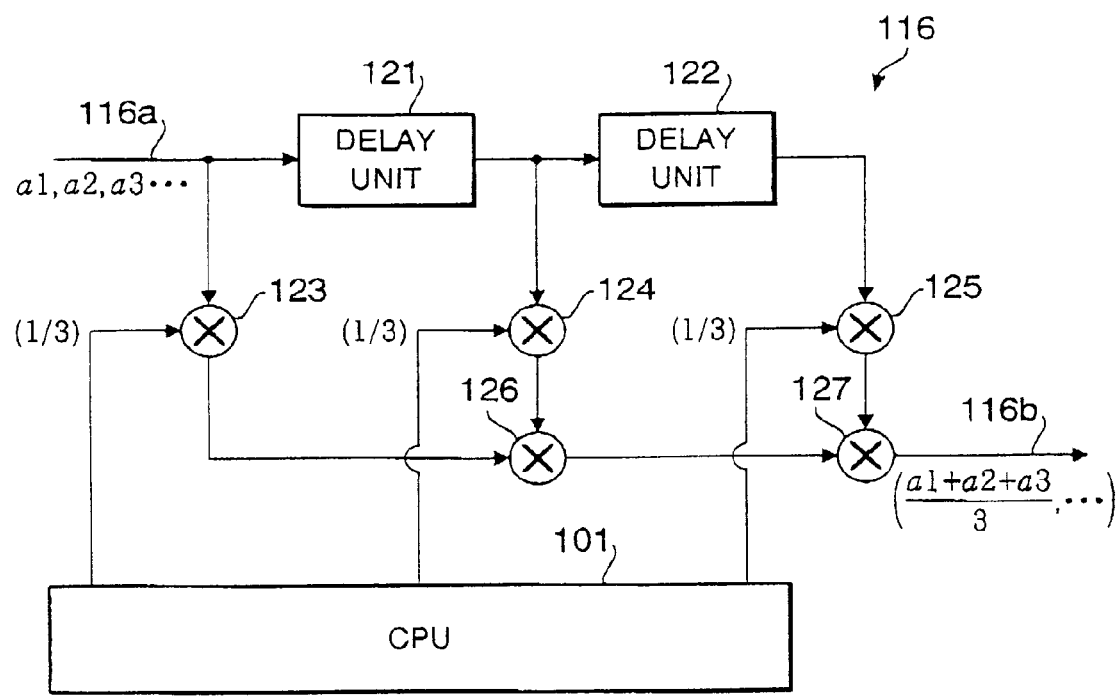
Figure 6A:
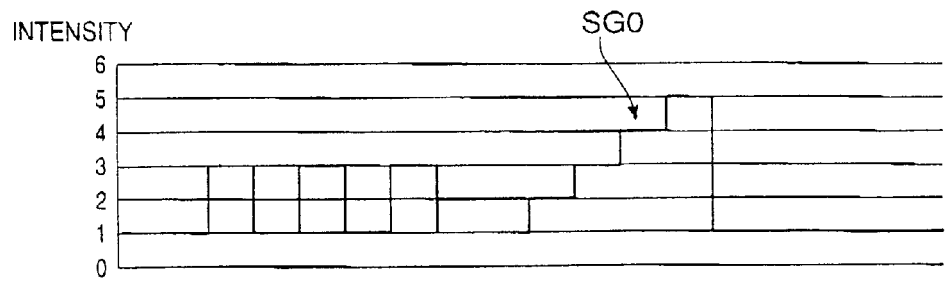
Figure 6B:
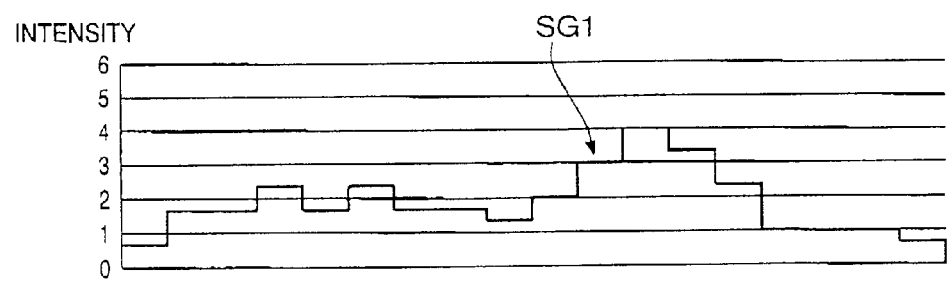
Figure 6C:
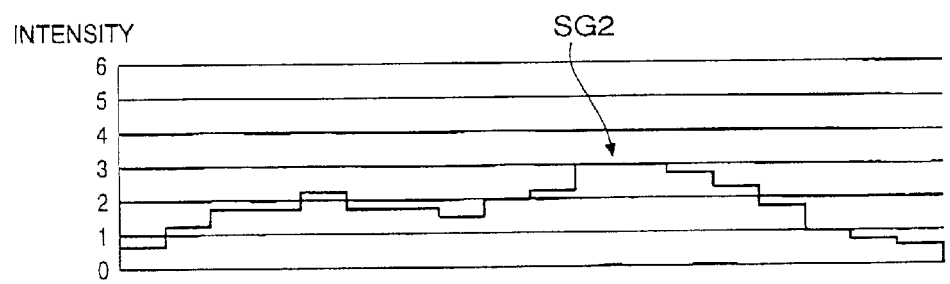
Figure 7:
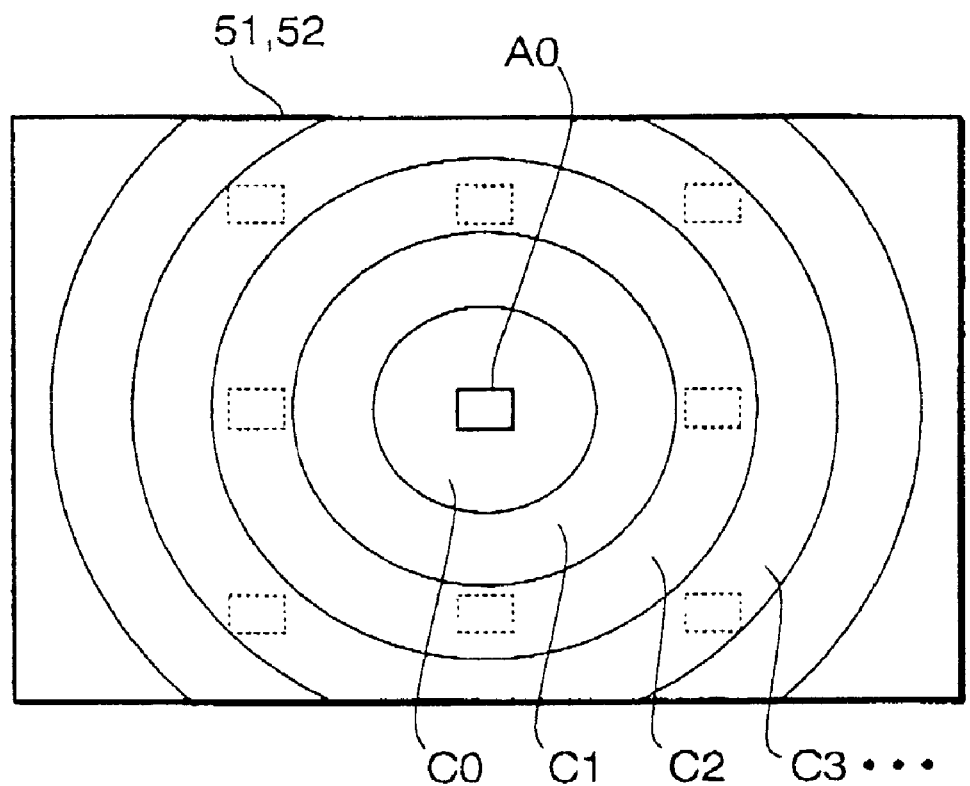
Figure 8A:
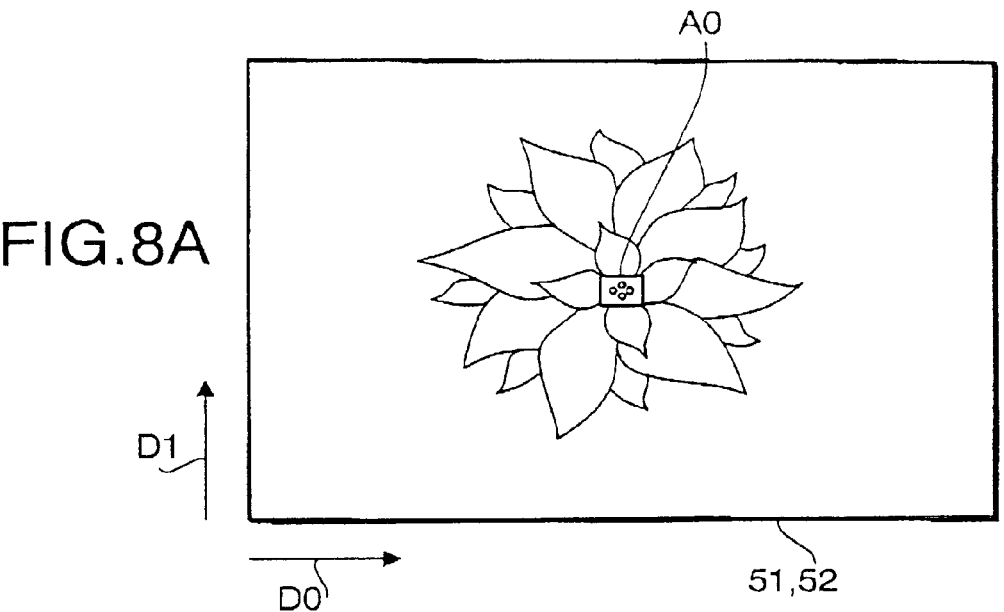
Figure 8B:
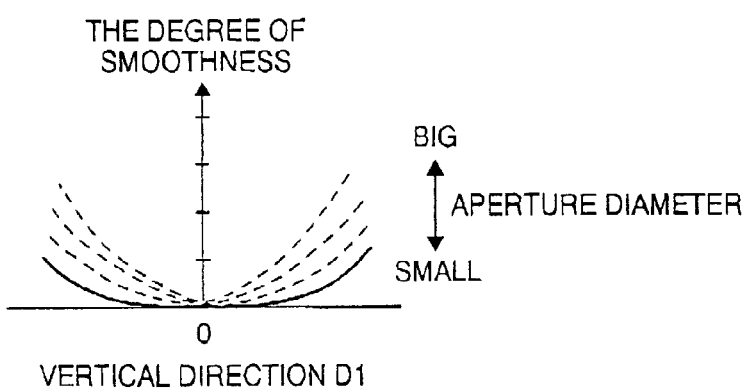
Figure 8C:
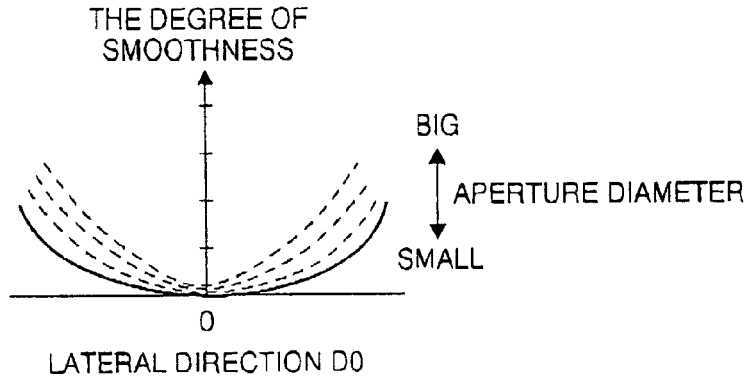
Figure 9A:
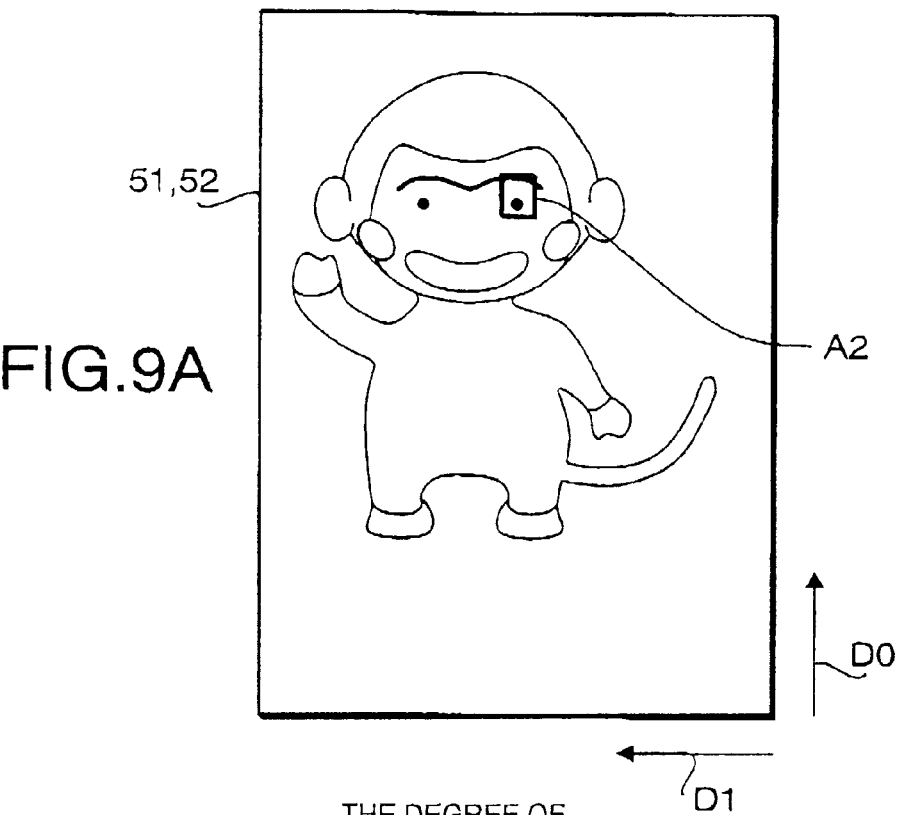
Figure 9B:
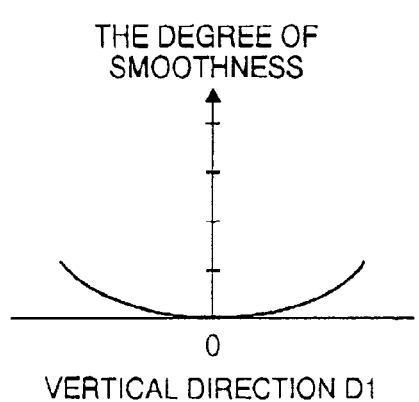
Figure 9C:
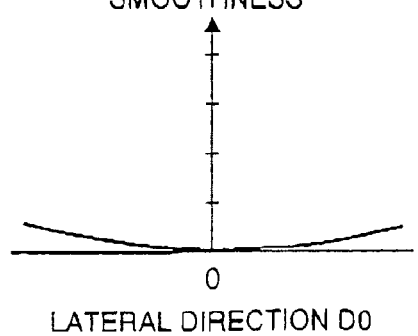
Figure 10:
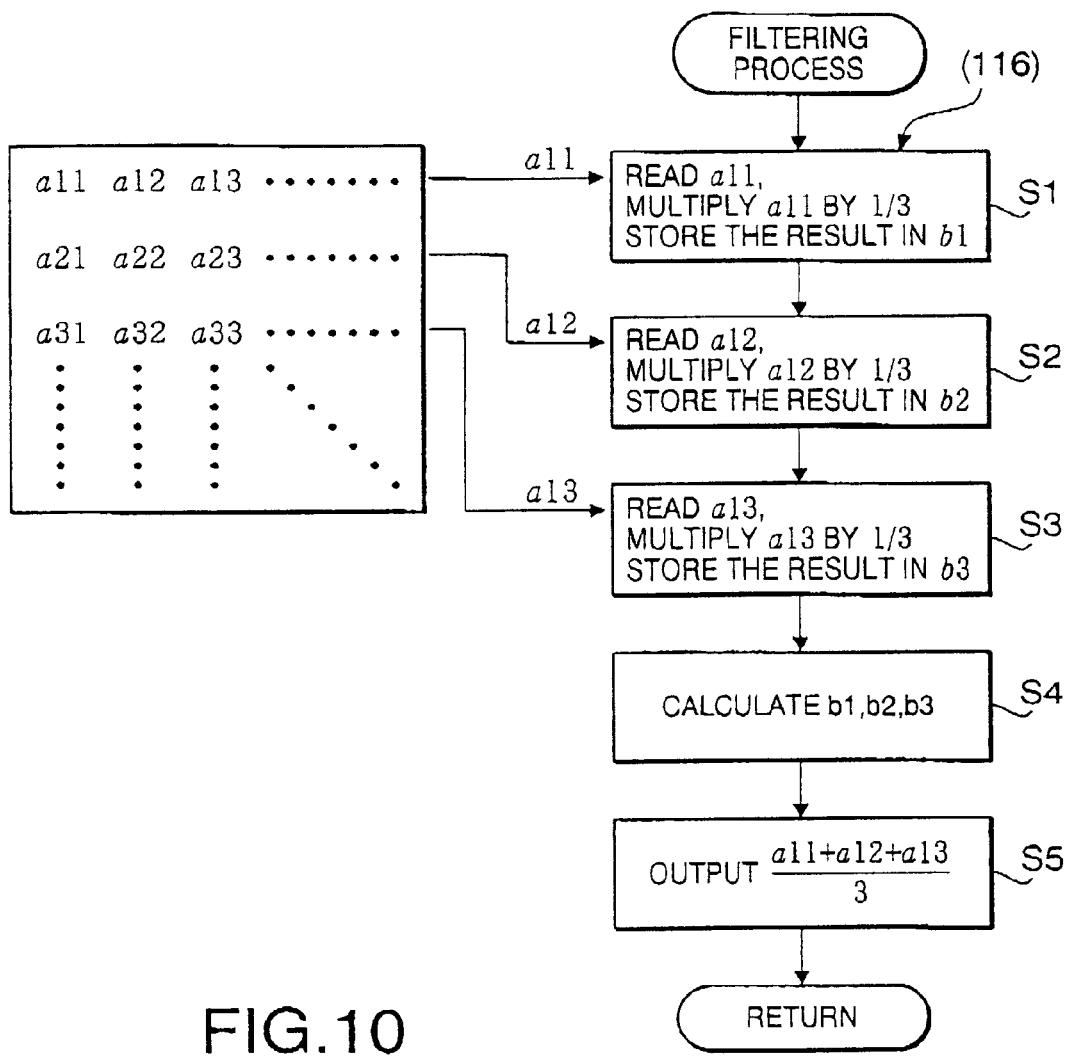

FIG. 3 schematically shows AF areas which are arranged in a finder field of the digital camera;

FIG. 4 shows a block diagram of a control system of the digital camera;

FIG. 5 shows a block diagram of the filtering unit provided in the digital camera;

FIG. 6A shows an example of an image data signal which is not smoothed;

FIG. 6B shows an image data signal which is smoothed by a filtering unit;

FIG. 6C shows an image data signal which is smoothed strongly in comparison with the image data signal shown In FIG. 6B;

FIG. 7 schematically shows an example of conditions used for performing a process for smoothing in a case where an AF area A0 is selected;

FIG. 8A shows an example of the object which is to be processed;

FIG. 8B is a graph showing an example of a change of the coefficient for weighting in a vertical direction of an finder frame shown in FIG. 8A;

FIG. 8C is a graph showing an example of a change of the coefficient for weighting in a lateral direction of the finder frame shown in FIG. 8A;

FIG. 9A shows another example of the object which is to be subjected to the process for blurring;

FIG. 9B is a graph showing an example of a change of the coefficient for weighting in the vertical direction of the finder frame shown in FIG. 9A;

FIG. 9C is a graph showing an example of a change of the coefficient for weighting in the lateral direction of the finder frame shown in FIG. 9A; and FIG. 10 is a flowchart showing a process for filtering executed by the CPU in the digital camera.

DETAILED DESCRIPTION OF THE EMBODIMENTS

Hereinafter, a digital camera 10 according to an embodiment of the present invention will be described with reference to the accompanying drawings.

Figure 1:
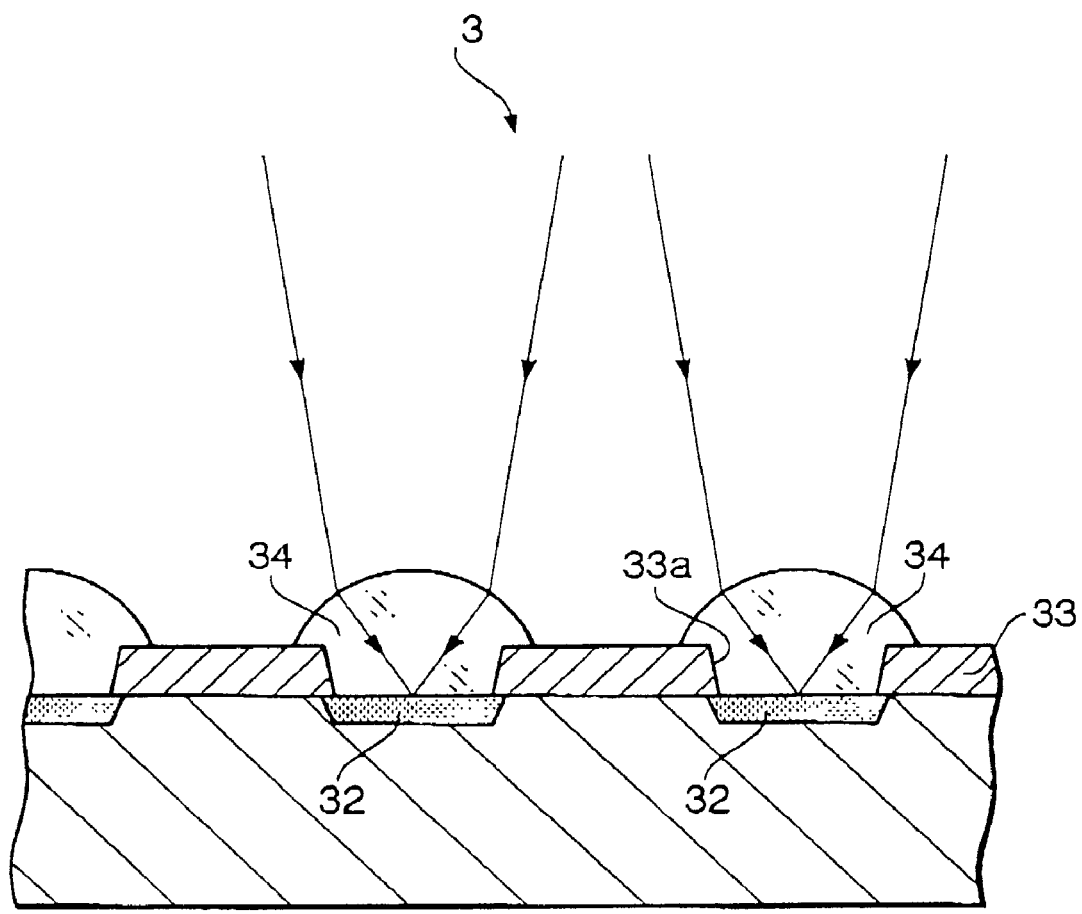
FIG. 1 is a cross sectional view of a CCD which is generally employed in a conventional digital camera.
Figure 2:
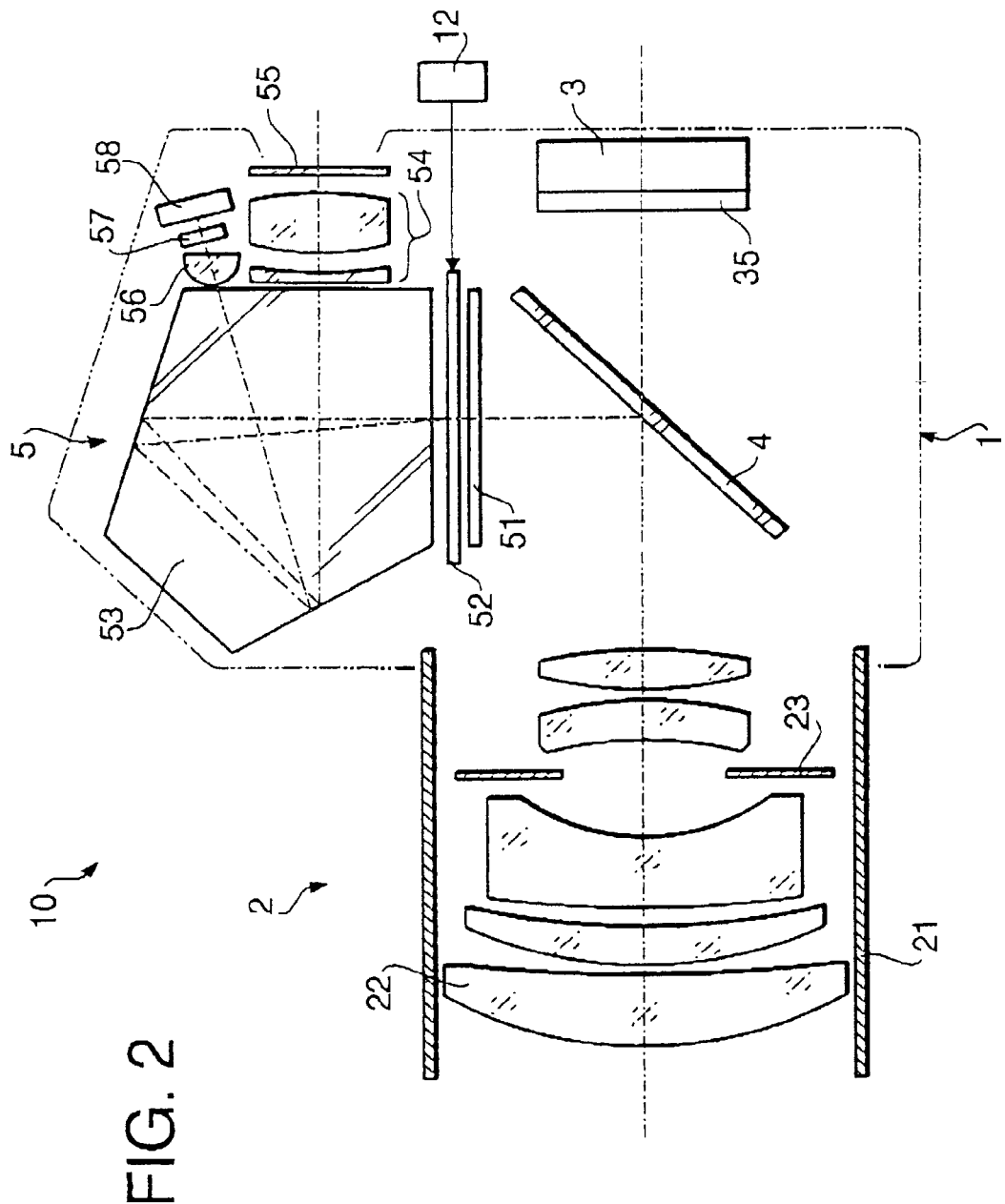
FIG. 2 shows a cross sectional view of a digital camera according to an embodiment of the invention.

FIG. 2 shows a cross sectional view of the digital camera 10. As shown in FIG. 2, the digital camera 10 is provided with a camera body 1, to which a photographing lens 2 is detachably attached. The photographing lens 2 includes a lens barrel 21 which accommodates lenses 22 for forming an image of an object, and an aperture 23.

on a rear side of the camera body 1, a CCD 3 which converts an image formed thereon into an image signal is arranged to intersect with an optical axis of the photographing lens 2. The structure of the CCD 3 is similar to the conventional one as shown In FIG. 1. That is, on the upper portion of the CCD 3, a plurality of photoreceptors (photo diodes) 32 are formed in the form of a matrix. Above the photodiodes 32, micro-lenses 34 are arranged, respectively. Further, in the digital camera 10, an optical lowpass filter 35 is provided on the top surface of the CCD 3 as shown in FIG. 2.

In the digital camera 10, the lenses 22 are driven by an AF (auto focusing) mechanism 15, under control of a CPU 101 (FIG. 4), to focus on an object. The photographing lens 2 is configured to telecentrically form the object image on the CCD 3.

The aperture 23 is configured such that the aperture size thereof is controllable, manually or electrically, so that the quantity of light passing through the photographing lens 2 is changed. The aperture diameter is changed manually, or automatically through an aperture driving mechanism 16 under control of the CPU 101.

A half mirror 4 is arranged in front of the CCD 3. Part of light passed through the photographing lens 2 is reflected by the half mirror 4 and is directed to an upward direction. The remaining portion of the light is directed to the CCD 3.

As shown In FIG. 2, a finder optical system 5 is arranged above the half mirror 4. The finder optical system 5 includes a focusing plate 51 on which an image is formed by the photographing optical system 2. Further, an AF frame LCD 52 is arranged on the focusing plate 51. The camera body 1 further includes a pentagonal prism 53 which is arranged above the AF frame LCD 52, an eyepiece lens 54 which is positioned at the rear of the pentagonal prism 53, and a protection glass 55 which is arranged at the rear of the pentagonal prism 53. On the rear side of the pentagonal prism 53, a lens 56, a filter 57 and a photometry device 58 are arranged at the upper rear potion of the camera body 1.

The AF frame LCD 52 is driven by an LCD drive circuit 18 under control of the CPU 101. As shown in FIG. 3, nine AF areas A0-A8 are arranged in a finder field in the form of a three-by-three matrix. Patterns corresponding to the AF areas A0-A8 are formed on the AF frame LCD 52. When a user selects one of the AF areas A0-A8 through an AF area setting button 12, one of the patterns corresponding to the selected AF area is indicated on the finder field. Therefore, a user can identify the selected AF area In the finder field. Alternatively, the AF area may be automatically selected under control of the CPU 101.

FIG. 4 shows a block diagram of a control system of the digital camera 10. In FIG. 4, elements similar to those shown In FIG. 2 are given the same reference numbers as in FIG. 2.

As shown in FIG. 4, the CPU 101 is supplied with power through a DC-DC converter 102, which converts a DC voltage of a battery 103 and output a converted DC voltage. To the CPU 101, signals indicative of operation of a photometry switch 13a and a release switch 13b are input. When a release button 13 is depressed halfway, the photometry switch 13a is ON, and when the release button 13 is fully depressed, the release switch 13b is ON. Further, to the CPU 101, an operation status of a mode setting button 14 is input The mode setting button 14 is used for setting defocused condition of the image captured by the digital camera 1. Further, the CPU 101 receives a setting signal of the AF area setting button 12 indicative of one of the AF areas A0-A8.

The CCD 3 is driven by a CCD driver 105 which operates based on clock signals output by a clock generator 104.

The CCD 3 converts an image formed on the light-receptive surface thereof to an image signal including a brightness component of the image. The image signal is amplified by an amplifier (AMP) 111, and the amplified image signal is input to an A-D converter 112 which converts the image signal into a digital image signal. The digital image signal is input to an image processing unit 113 which applies predetermined processing to the digital image signal. As a result, the Image processing unit 113 generates an image data.

The image data generated by the image processing unit 113 is input to a data compression unit 114 which Is capable of performing image data compression. The data compression unit 114 can be switched between a mode in which image data compression is performed and a mode in which image data compression is not performed, i.e., the image data generated by the image processing unit 113 is directly input to an image memory 115. Therefore, either the compressed image data or the image data which is not compressed is stored in the image memory 115.

As shown in FIG. 4, the image data generated by the image processing unit 113 is also input to a filtering unit 116 which processes the image data so that a background of the image appears blurred (defocused). The filtering unit 116 is composed of a digital filter.

FIG. 5 shows a block diagram of the filtering unit 116. As shown in FIG. 5, the filtering unit 116 Includes two delay circuits 121, 122 for delaying pixel data input to an input terminal 116a, multipliers 123-125, and adders 126, 127. Each of the delay circuits 121 and 122 delays the pixel data which is sequentially input to the input terminal 116a by a fixed time interval. Each of the multipliers 123-125 multiplies the pixel data by a coefficient for weighting. The adders 126 and 127 sum outputs of the multipliers 123-125, which is output on an output terminal 116b. Thus, the filtering unit 116 functions as a low pass filter which calculates moving averages of the image data.

In particular, since characteristics of the filtering unit 116 are controlled by the CPU 101, they can be changed while the plurality of pieces of pixel data which constitute one image are sequentially input to the filtering unit 116. Therefore, the moving averages are calculated while the CPU 101 changes the characteristics of the filtering unit.

The CPU 101 controls the characteristics of the filtering unit 116 by changing the number of pixels which are used for calculating the moving averages. This corresponds to changing the number of delay units and multipliers and values of the coefficients of the digital filter.

With this configuration, the degree of smoothness of the image can be changed by changing the characteristics of the filtering unit 116.

As shown in FIG. 5, if the values of the coefficients are set at one third by the CPU 101, a moving average is $(a1+a2+a3)/3$ where a1, a2 and a3 are three pieces of pixel data sequentially input to the filtering unit 116.

When the photometry switch 13a is switched to ON, intensity information output by the photometry device 58 and the brightness component of the image output by the CCD 3 are input to an exposure control unit 106, and then the exposure control unit 106 determines an exposure value. Next, the exposure value determined by the exposure control unit 106 is inputted to the CPU 101. Further, in a case where one of the AF areas A0-A8 is selected through the use of the AF area setting button 12, the CPU 101 controls the LCD drive circuit 18 to display the selected AF area on the AF frame LCD 52, and controls the AF mechanism 15 to perform focusing. The CPU 101 displays various information as to photo shooting on an external display 7.

When the release switch 13b is switched to ON, the CPU 101 controls the aperture driving mechanism 16 and the CCD 3 to start accumulation of charges in the CCD 3. The CPU 101 also controls a strobe control unit 19 to emit flashlight from strobe 6 in case of necessity.

The process of photo shooting using the digital camera 10 will be described. A user initially observes a finder image on which the AF areas A0-A8 are overlaid. The user selects an AF area in which the object is positioned through the use of the AF area setting button 12 When the photometry switch 13a is switched to ON, the CPU 101 controls the AF mechanism 15 to focus on the object in the selected AF area. Thus, the light passing though the photographing lens 2 is focused on the light-receptive surface of the CCD 3. Further, the CPU 101 determines an aperture diameter (f number) of the aperture 23 based on the exposure value output by the exposure control unit 106.

When the release switch 13b is switched to ON, accumulation of charges in the CCD 3 on which the image is formed starts. Then, the charges accumulated in the CCD 3 is output as the image signal according to driving pulses output by the CCD driver 105. The image processing unit 113 processes the image signal to generate Image data. Next, the compressed image data or the image data which is not compressed is stored in the image memory 115. Since image processing for generating image data performed by the image processing unit 113 is generally known, a detailed description of image processing will be omitted.

If the mode setting button 14 is ON, the CPU 101 controls the filtering unit 116 to perform a process for blurring the background of the image. The filtering unit 116 calculates moving averages of a plurality of pieces of the pixel data which are sequentially input to the filtering unit 116 from the image processing unit 113.

FIG. 6A shows an example of an Image data signal SG0 corresponding to a horizontal line of the image. If the image data signal SG0 Is input from the image processing unit 113 to the filtering unit 116 when the characteristics of the filtering unit 116 are controlled such that the degree of smoothness of the image becomes relatively low, an Image data signal SG1 shown in FIG. 6B is output by the filtering unit 116. As shown in FIG. 6B, the image data signal SG1 is smoothed out.

FIG. 6C shows a case where the characteristics of the filtering unit 116 are controlled such that the degree of smoothness of the image becomes relatively high. As shown in FIG. 6C, an image data signal SG2 is smoother than the image data signal SG1.

A detailed explanation of the filtering unit 116 will be described below. Before the CPU 101 performs the process for blurring the background of the image, the CPU 101 determines conditions which are used to perform the process for blurring based on information with regard to the selected AF area.

Assuming that the selected AF area is the area A0 which is positioned at a center of the image. FIG. 7 shows an example of conditions used for performing the process for blurring In a case where the AF area A0 is selected. As shown in FIG. 7, the CPU 101 divides the image which is to be processed into a plurality of annular zones (C0, C1, C2, C3, . . . ) concentrically arranged about the selected AF area A0. The CPU 101 understands one of the zones in which pixel data input from the image processing unit 113 to the filtering unit 116 is included. The CPU 101 sets different values of the coefficient for each zones (C0, C1, C2, C3, . . . ) so that the degree of smoothness is changed depending on a position of the pixel data in the image.

In this example, the degree of smoothness increases like a curve of a quadratic function as the distance from the AF area A0 to a position at which a moving average of the pixel data is calculated increases.

With this configuration, the degree of the defocused condition in the annular zone (i.e., in the background of the image) can be increased as the distance from the AF area A0 to the annular zone increases.

The degree of the defocused condition for the annular zones may be changed at a first ratio along a longer side of a finder frame and at a second ratio which is not equal to the first ratio along a shorter side of the finder frame. In this case, the first ratio and the second ratio represent the relationship between distance of the relative distances of the annular zones from the AF area A0 and the corresponding degree of the defocused condition.

FIG. 8A shows an example of the object (a finder field) which is to be processed. If a user takes a picture of a flower shown in FIG. 8A, the user selects the AF area A0 so that a pistil or a stamen of the flower comes into focus.

A solid line shown in FIG. 8B is a graph showing an example of a change of the degree of smoothness of the image in a vertical direction D1. A position 0 on a horizontal axis in FIG. 8B corresponds to the AF area A0. As shown in FIG. 8B, the degree of smoothness of the image increases as the distance from the AF area A0 to a position at which a moving average of the pixel data is calculated increases.

A solid line shown in FIG. 8C is a graph showing an example of a change of the degree of smoothness of the image in a lateral direction D0. A position 0 on a horizontal axis in FIG. 8C corresponds to the AF area A0. As shown in FIG. 8C, the degree of smoothness increases as the distance form the AF area A0 to a position at which a moving average of the pixel data is calculated increases.

Is should be appreciated that since changes of the degree of smoothness of the image in the vertical direction D1 and in the lateral direction D0 are the same, the degree of change of defocused condition in vertical direction D1 and the degree of change of defocused condition in the lateral direction D0 are the same. This means that, a zone in which the degree of defocused condition is uniform has the form of a circle. Accordingly, the background of the object (the flower) whose shape in the finder view is approximately circular can be well blurred.

The CPU 101 obtains an object distance and the size of the aperture 23 when an image Is captured. Therefore, the degree of smoothness of the image can be changed based on the aperture diameter (i.e., an f number) and/or the object distance when an image is captured as well as the distance from the AF area A0 to a position at which a moving average is calculated. As shown dashed lines in FIGS. 8B or 8C, the degree of smoothness may be increased as the aperture size increases Alternatively or additionally, the degree of smoothness may be increased as the object distance decreases.

If a digital camera 10 has an aperture driving mode, the degree of smoothness of the image may be changed based on the aperture diameter manually selected by the user.

In this case, the degree of defocus condition of the background of the image can be increased as the object distance decreases and/or as the aperture diameter increases. That is, the degree of the defocus condition of the background of the image can be changed depending on the aperture size and/or the object distance as in the case of the camera using a film.

FIG. 9A shows another example of the object (a finder field) which is to be processed. It should be noted that this example is a portrait, and therefore, a finder frame (i.e., the digital camera) is positioned such that the longer side of the finder frame is oriented In a vertical direction. In this case, the AF area A2 which is positioned near the perimeter of the finder frame is selected to focus on an eye of the person.

FIGS. 9B and 9C are graphs showing changes of the degree of smoothness of the image.

A solid line In FIG. 9B is a graph showing a change of the degree of smoothness in the vertical direction D1. A position 0 on a horizontal axis in FIG. 9B corresponds to the AF area A2. As shown in FIG. 9B, the degree of smoothness of the image increases as the distance from the AF area A2 to a position at which a moving average is calculated increases.

A solid line in FIG. 9C is a graph showing a change of the degree of smoothness of the image in a lateral direction D0. A position 0 on a horizontal axis in FIG. 9C corresponds to the AF area A2. As shown in FIG. 9C, the degree of smoothness increases as the distance form the AF area A2 to a position at which a moving average Is calculated increases.

As can be seen from FIGS. 9B and 9C, the rate of the change of the degree of smoothness in the vertical direction D1 is greater than the rate of the change of the degree of smoothness in the lateral direction D0. That is, the rate of increase of the degree of smoothness in the lateral direction D0 is milder than the rate of increase of the degree of smoothness in the vertical direction D1. Therefore, in the image processed to appear defocused, the degree of the defocused condition increases gently in the lateral direction D0 as the distance from the AF area A2 to a position at which a moving average is calculated increases in comparison with an increase of the degree of the defocused condition in the vertical direction D1. This means that, a zone in which the degree of the defocused condition is uniform has the form of an ellipse.

Accordingly, in a case where a picture of a person such as the image shown in FIG. 9A is picked up by the digital camera 10, it becomes possible to reduce the degree of the defocused condition in an area of the person's body, and to increase the degree of the defocused condition in the background of the image.

If the mode setting button 14 is OFF, the data compression unit 114 uses the image data directly transferred from the Image processing unit 113, i.e., the process for blurring is not performed. This operation in which the process for blurring is not performed is advantageous in a case where a user takes a picture of a landscape because the entire region of this picture substantially comes into a focus.

Variations of the above-mentioned embodiment can be made. For example, alternative to or in addition to the use of the object distance and/or the aperture diameter, the CPU 101 may use a focus length of the photographing lens 2 for determining the degree of smoothness of the background of the image (i.e., the characteristics of the filtering unit 116) This is advantageous in a case where the digital camera 10 is capable of using a zoom lens or an interchangeable lens as the photographing lens 2.

That is, the CPU 101 increases the degree of smoothness when a long focal length is used. In this case, is becomes possible to increase the degree of the defocused condition when the long focal length is used, and to decrease the degree of the defocused condition when a short focal length is used.

Alternative to the filtering unit 116 which is configured to calculate moving averages, another type of digital filter which is capable of changing spatial frequencies of an image may be used.

Alternatively, the CPU 101 may be configured to perform a process for filtering according to a program stored in a ROM (not shown) incorporated in the CPU 101. In this case, the filtering unit 116 can be omitted FIG. 10 is a flowchart showing a process for filtering executed by the CPU 101. In FIG. 10, reference numbers (a11, a12, a13, . . . ) corresponding to pixels in an image are shown for reference purposes. Initially, the CPU 101 obtains pixel data all output by the image processing unit 113, and multiplies all by one third, and then, stores the result (a11/3) into a variable b1 (step S1). Similarly, a12/3 and a13/3 are stored in variables b2 and b3, respectively (S2, S3). Next, the sum of b1, b2 and b3 is calculated, and then, the result ((a11+a12+a13)/3) is sent to the data compression unit 114 (S5). This process is repeated until all the pixel data of one image are processed.

As described above, the digital camera can blur the background of the image based on the object distance, the aperture diameter of the photographing lens and/or the focal length of the photographing lens as in the case of the camera which uses the film. Therefore, there is no necessity to retouch the image picked up by the digital camera 10 using a photo retouch software.

The present disclosure relates to the subject matter contained in Japanese Patent Application No. 2001-286211, filed on Sep. 20, 2001, which is expressly incorporated herein by reference in its entirety.

What is claimed is:

1. A digital camera for capturing images, the camera comprising:
an optical system which forms an object image;
an image pick-up device which receives the object image and outputs an image signal corresponding to the received object image;
a filtering system which receives and processes the image signal so that a smoothing effect is applied to at least a portion of the object image, said filtering system calculating moving averages of pixel data in the image;
the filtering system being configured to select a focused area which is in a focused condition, and to process the image signal such that the smoothing effect resulting from a degree of defocus changes gradually in accordance with a distance from the focused area;
a filter control system which is configured to change characteristics of said filtering system, in accordance with a distance between a first position, which lies in the image, and a second position at which the moving average is calculated, and
an automatic focusing system which drives said optical system to perform focusing, said automatic focusing system having at least one AF area in which said optical system focuses on the object, and said automatic focusing system being configured to manually or automatically select one of the at least one AF area,
wherein the first position corresponds to the one of the at least one AF area manually or automatically selected by the automatic focusing system, and
wherein the rate of a change of the degree of smoothness of the image in a lateral direction of the image is different from the rate of a change of the degree of smoothness of the image in a vertical direction of the image.

2. The digital camera according to claim 1, wherein the first position is a center of the image.

3. The digital camera according to claim 1, wherein said filter control system changes the characteristics of said filtering system such that the image includes at least one annular zone in which the degree of smoothness is uniform, the at least one annular zone being arranged concentrically about the first position.

4. The digital camera according to claim 1, wherein said filter control system changes the characteristics of said filtering system corresponding to at least one of an object distance when the image is captured, an aperture diameter of an aperture which is provided in said optical system when the image is captured, and a focal length of said optical system in addition to the distance between the first position and the second position.

5. The digital camera according to claim 1,
wherein said optical system is a zoom lens, and
wherein said filter control system changes the characteristics of said filtering system responsive to a focal length of said zoom lens when the image is captured in addition to the distance between the first position and the second position.

6. The digital camera according to claim 1, further comprising an image processing system which processes the image signal to generate image data corresponding to the image formed by said optical system,
wherein said filtering system is a digital filter which filters the image using the image data generated by said image processing system.

7. The digital camera according to claim 1, further comprising:
an automatic aperture control system which calculates an f number to be used for capturing the image based on brightness information of the image to be captured and adjusts an aperture diameter of an aperture provided in said optical system according to the calculated f number,
wherein said filter control system changes the characteristics of said filtering system responsive to the f number calculated by said automatic aperture control system in addition to the distance between the first position and the second position.

8. A digital camera, comprising:

an image capturing system that captures an image of an object within a predetermined area and outputs an image signal representing the captured image;

a processing system that processes the image signal; and a storage that stores the image signal processed by said processing system in the form of image data, wherein said processing system includes a filtering system that defines at least one partial area in the predetermined area and converts a part of the image signal representing an image segment included in the at least one partial area such that the image segment appears defocused;

said filtering system defining a plurality of annular areas centered about a predetermined point in said predetermined area, said filtering system being configured to vary a degree of defocus condition of image segments in accordance with the annular areas in which the image segments are included;

a focusing condition detection system, said predetermined point corresponding to a point at which said focusing condition detection system detects a focusing condition of the object, said focusing condition detection system is capable of detecting a focusing condition of an object at a selected one of a plurality of points defined in the predetermined area, said predetermined point corresponding to the selected one of said plurality of points, wherein said filtering system changes the degree of defocused condition for the plurality of annular areas at a first ratio along a longer side of the predetermined area, and at a second ratio along a shorter side of the predetermined area, and the first ratio and the second ratio are different.

9. The digital camera according to claim 8, wherein the degree of defocused condition of the image segment is greater for an image segment included in an outer annular area than an image segment included in an inner annular area.

10. The digital camera according to claim 8, wherein each of the first ratio and the second ratio is varied depending on at least one of an object distance, an aperture size of a photographing lens of the digital camera and a focal length of the photographing lens.

11. The digital camera according to claim 8, the filtering system being configured to calculate moving averages of pixel data in the image.

12. A digital camera for capturing images, said digital camera comprising:

an image capturing system configured to capture an image of an object and to output an image signal representing the captured image; and a filtering system which receives and processes the image signal, the filtering system being configured to define a plurality of annular areas positioned about a predetermined point in an area of the object image, the filtering system varying a degree of defocus of image segments in accordance with the annular areas in which the image segments are included, wherein the filtering system is configured to change the degree of defocused condition for the plurality of annular areas at a first ratio along a longer side of the image, and at a second ratio along a shorter side of the image; and wherein the first ratio and the second ratio are different.

13. The digital camera according to claim 12, the filtering system being configured to calculate moving averages of pixel data in the image.

14. The digital camera according to claim 12, wherein the degree of the defocused condition of the image segment is greater for an image segment included in an outer annular area than for an image segment included in an inner annular area.

* * * * *